US009241280B2

(12) United States Patent
Kallin et al.

(10) Patent No.: US 9,241,280 B2
(45) Date of Patent: Jan. 19, 2016

(54) METHODS AND ARRANGEMENTS FOR TESTING A TRANSMISSION PARAMETER VALUE IN A WIRELESS COMMUNICATION SYSTEM (75) Inventors: Harald Kallin, Sollentuna (SE); Birgitta Olin, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 182 days.

(21) Appl. No.: 14/112,048

(22) PCT Filed: Apr. 29, 2011

(86) PCT No.: PCT/SE2011/050537
§ 371 (c)(1),
(2), (4) Date: Oct. 16, 2013

(87) PCT Pub. No.: WO2012/148334
PCT Pub. Date: Nov. 1, 2012

(65) Prior Publication Data
US 2014/0038630 A1    Feb. 6, 2014

(51) Int. Cl.
H04W 24/00    (2009.01)
H04W 24/08    (2009.01)
H04B 17/12    (2015.01)
H04B 17/18    (2015.01)
(Continued)

(52) U.S. Cl.
CPC ............. *H04W 24/08* (2013.01); *H04B 17/12* (2015.01); *H04B 17/18* (2015.01); *H04B 17/309* (2015.01); *H04W 24/02* (2013.01); *H04W 24/10* (2013.01)

(58) Field of Classification Search
CPC ...... H04W 24/00; H04W 24/02; H04W 24/04; H04W 24/06; H04W 24/08; H04W 24/10
USPC ................................. 455/423, 424, 425, 452.1
See application file for complete search history.

(56) References Cited

U.S. PATENT DOCUMENTS 5,768,260 A * 6/1998 Lindgren et al. .............. 370/252
7,167,681 B2 1/2007 Kuurne et al.
(Continued)

FOREIGN PATENT DOCUMENTS

WO    2010075320 A1    7/2010

OTHER PUBLICATIONS

International Search Report and Written Opinion for PCT/SE2011/050537, mailed Jan. 26, 2012, 13 pages.
(Continued)

*Primary Examiner* — Temica M Beamer
(74) *Attorney, Agent, or Firm* — Patent Portfolio Builders, PLLC (57) ABSTRACT

A method in a first radio network node for testing a transmission parameter value in a wireless communication system is provided. The first radio network node is configured to, during operational mode thereof, perform transmissions using available resources divided in to resource blocks. The first radio network node allocates a test resource block, for test purposes, among the available resources. The first radio network node defines for the test resource block, a test value for the transmission parameter. The test value differs from the nominal value. The first radio network node performs, during operational mode, a test transmission using the resource block. During the test transmission, the transmission parameter is set to the test value. The test transmission is configured to form the basis for an evaluation of the test value.

19 Claims, 6 Drawing Sheets

(51) Int. Cl.
*H04B 17/309* (2015.01)
*H04W 24/02* (2009.01)
*H04W 24/10* (2009.01)

(56) References Cited

U.S. PATENT DOCUMENTS

| | | |
|---|---|---|
| 2005/0136911 A1 | 6/2005 | Csapo et al. |
| 2006/0009210 A1 | 1/2006 | Rinne et al. |
| 2008/0153423 A1* | 6/2008 | Armstrong et al. ........ 455/67.14 |
| 2009/0310492 A1 | 12/2009 | Kazmi et al. |
| 2011/0009105 A1 | 1/2011 | Lee et al. |
| 2013/0003687 A1* | 1/2013 | Woodley et al. .............. 370/329 |

OTHER PUBLICATIONS

International Preliminary Report on Patentability for PCT/SE2011/050537, mailed Apr. 30, 2013, 6 pages.

NEC et al., "R2-072432: UE assistance for self-optimizing of network," 3rd Generation Partnership Project (3GPP), TSG-RAN WG2, Jun. 25-29, 2007, 4 pages, Orlando, USA.

Feng, Sujuan et al., "Self-Organizing Networks (SON) in 3GPP Long Term Evolution," Nomor Research White Paper, No. XP007907980, May 20, 2008, Nomor Research GmbH, Munich, Germany, 15 pages.

Examination Report for European Patent Application No. 11864513.4-1854, mailed May 5, 2015, 9 pages.

* cited by examiner

METHODS AND ARRANGEMENTS FOR TESTING A TRANSMISSION PARAMETER VALUE IN A WIRELESS COMMUNICATION SYSTEM

This application is a 35 U.S.C. §371 national phase filing of International Application No. PCT/SE2011/050537, filed Apr. 29, 2011, the disclosure of which is incorporated herein by reference in its entirety.

TECHNICAL FIELD

Embodiments herein relate to a radio network node and a method in a radio network node. Embodiments herein further relate to a method in a wireless communication system. In particular, embodiments herein relate to a method and an arrangement for testing a transmission parameter value in the wireless communication system.

BACKGROUND

In a typical wireless communication system, User Equipments (UEs), communicate via a Radio Access Network (RAN) to one or more core networks (CNs).

A user equipment is a mobile terminal by which a subscriber can access services offered by an operator's core network. The user equipments may be for example communication devices such as mobile telephones, cellular telephones, or laptops with wireless capability. The user equipments may be portable, pocket-storable, hand-held, computer-comprised, or vehicle-mounted mobile devices, enabled to communicate voice and/or data, via the radio access network, with another entity, such as another mobile station or a server.

User equipments are enabled to communicate wirelessly in the wireless communication system. The communication may be performed e.g. between two user equipments, between a user equipment and a regular telephone and/or between the user equipment and a server via the radio access network and possibly one or more core networks, comprised within the wireless communication system.

The wireless communication system covers a geographical area which is divided into cell areas. Each cell area is served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also on cell size.

A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some radio access networks, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or eNBs, may be directly connected to one or more core networks.

UMTS is a third generation, 3G, mobile communication system, which evolved from the second generation, 2G, mobile communication system GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to further evolve the UTRAN and GSM based radio access network technologies.

In the context of this disclosure, a base station as described above will be referred to as a base station or a Radio Base Station (RBS). A user equipment as described above, will in this disclosure be referred to as a user equipment or a UE.

The expression DownLink (DL) will be used for the transmission path from the base station to the user equipment. The expression UpLink (UL) will be used for the transmission path in the opposite direction i.e. from the user equipment to the base station.

A wireless communication system typically consists of a large number of cells. The radio communication in a cell may suffer from poor transmission quality due to interference in the radio environment. The interference source may be for example other cells or user equipments, or other, external, sources.

Several important factors for obtaining a required balance between area coverage, system capacity and user satisfaction in a wireless communication system may be related to transmission parameters, such as for example antenna tilt, antenna direction, antenna gain and transmitter output power. Some such parameters, for example receiver sensitivity, coding and modulation may be fixed or limited to certain values in the standards.

Determining a suitable transmission parameter value such as an antenna tilt et cetera is far from a trivial task, since the settings in one cell may not only impact the situation in the cell, but also heavily impact the situation and transmission quality in other cells.

Computer simulations may be used to evaluate transmission parameters such as antenna tilts et cetera, and their impact on the radio situation and transmission quality for several cells. A drawback with this is, however, that the results cannot be more accurate than the input into the simulations. Hence, the simulation may not be valid if reality differs from the simulation, or changes over time.

For example, if user equipments in reality are located differently and moves in different ways compared to a simulated scenario, the result of the simulation may not be valid for the real situation. Moreover, changes in the real environment, such as new houses, new highways et cetera, may not be updated in the simulated scenario, which may also render a simulation result invalid. Such changes in the environment does not only change the actual geography, but also the distributions and behaviors of subscribers, and thus of user the equipments. This in turn affects the traffic patterns and the interference in the radio environment.

SUMMARY

In view of the discussion above, it is an object for embodiments herein to provide an improved way of testing a test transmission parameter value in a wireless communication system.

According to a first aspect, the object is achieved by a method in a first radio network node for testing a transmission parameter value in a wireless communication system. The first radio network node is comprised in the wireless communication system. The first radio network node is configured to, during operational mode thereof, perform transmissions using available resources comprising time resources and frequency resources which are divided into resource blocks. Each resource block has a respective time range and a respective frequency range. The first radio network node has a transmission parameter which, during operational mode of the first radio network node, is set to a nominal value. The first radio network node allocates a test resource block, for test purposes, among the available resources. The first radio network node defines for the test resource block, a test value for the transmission parameter. The test value differs from the nominal value. The first radio network node performs, during operational mode, a test transmission using the resource block. During the test transmission, the transmission parameter is set to the test value. The test transmission is configured to form the basis for an evaluation of the test value.

According to a second aspect, the object is achieved by a first radio network node for testing of a transmission parameter value in a wireless communication system. The first radio network node is comprised in the wireless communication system. The first radio network node is configured to, during operational mode thereof, perform transmissions using available resources comprising time resources and frequency resources which are divided into resource blocks. Each resource block has a respective time range and a respective frequency range. The first radio network node has a transmission parameter which, during operational mode of the first radio network node, is set to a nominal value. The first radio network node comprises an allocation unit. The allocation unit is configured to allocate a test resource block, among the available resources, for test purposes. The first radio network node further comprises a defining unit. The defining unit is configured to define, for the test resource block, a test value for the transmission parameter. The test value differs from the nominal value. The first radio network node further comprises a transmitter. The transmitter is configured to transmit, during operational mode, a test transmission using the test resource block. During the test transmission, the transmission parameter is set to the test value. The test transmission is configured to form the basis for an evaluation of the test value.

According to a third aspect, the object is achieved by a method in a wireless communication system for testing a transmission parameter value in the wireless communication system. The wireless communication system comprises a first radio network node. The first radio network node is configured to, during operational mode thereof, perform transmissions using available resources comprising time resources and frequency resources which are divided into resource blocks. Each resource block has a respective time range and a respective frequency range. The first radio network node has a transmission parameter which, during operational mode of the first radio network node is set to a nominal value. The wireless communication system further comprises a network management node. A test transmission schedule is defined by the network management node. The test transmission schedule is to be provided to the first radio network node for the purpose of performing test transmissions. The first radio network node allocates a test resource block among the available resources according to the test transmission schedule, for test purposes. The first radio network node defines a test value for the transmission parameter for the test resource block, according to the test transmission schedule. The test value differs from the nominal value. The first radio network node performs, during operational mode, a test transmission using the test resource block. During the test transmission, the transmission parameter is set to the test value. The test transmission is configured to form the basis for an evaluation of the test value. The first base station obtains performance data. The performance data relates to a radio quality measured by a second radio network node during the test transmission, or is an indicator in the first radio network node that a transmission error occurred during the test transmission. The first radio network node sends the performance data to the network management node. The network management node evaluates the test value based on the performance data.

Thanks to embodiments herein, where a test resource block is allocated, among the available resources, for test purposes, a test transmission can be performed to evaluate a test value for a transmission parameter for a during operational mode of the radio network node. This enables testing of the test value in a real environment.

DETAILED DESCRIPTION

Embodiments herein may be exemplified in the following non-limiting description of embodiments.

Figure 1:
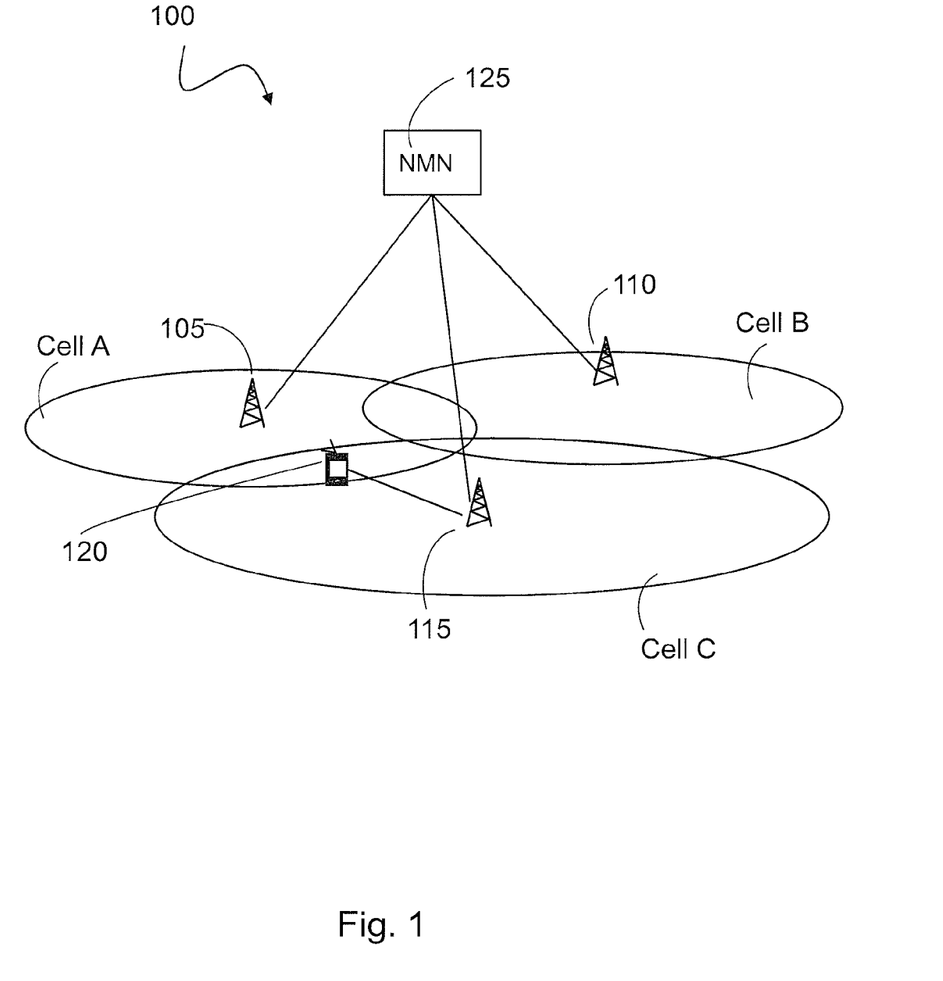
FIG. 1 is a schematic block diagram illustrating an embodiment of a wireless communication system.

FIG. 1 illustrates a wireless communication system 100 in which embodiments herein may be implemented. The wireless communication system 100 comprises a first base station 105, serving a cell A, a second base station 110 serving a cell B, and a third base station 115 serving a cell C. The first base station 105, the second base station 110 and the third base station 115 are radio network nodes and may belong to the same or to different radio access technologies, such as for example GSM, LTE, or WCDMA, and be for example a radio base station such as an eNodeB, or a NodeB.

The wireless communication system 100 further comprises a user equipment 120. The user equipment 120 is also a radio network node and may be for example a communication device such as a mobile telephone, a cellular telephone, or a laptop with wireless capability. The user equipment 110 may be a portable, pocket-storable, hand-held, computer-comprised, or vehicle-mounted mobile device.

It is to be understood that the three cells, three base stations, and one user equipment that are shown in FIG. 1 are illustrated by way of example, and that in some embodiments the wireless communication system 100 may comprise another, possibly much larger, number of base stations and/or cells and/or user equipments.

The wireless communication system 100 further comprises a network management node 125. The network management node 125 may be a physical network node or a logical network node. It may form part of the core network or the radio access network. The network management node may form an integrated part of for example one of the depicted base stations 105, 110, 115, or form part of another network node in the wireless communication system 100, such for example a MME, a RNC, or a dedicated management node such as an Operating Support System, Network Management System or a computer dedicated to scheduling, processing and analysing measurement data.

In this example, the user equipment 120 and the first base station 105 communicate with each other by uplink and downlink transmissions. The transmissions are performed in the time domain and in the frequency domain, that is, each transmission lasts a respective time period, and makes use of, i.e. spans over, a respective frequency band. The transmissions are scheduled by a scheduler in the base station 105, which allocates so called "resource blocks" to each transmission to be scheduled. Each resource block has a time range and a frequency range which may vary depending on the radio access technology used by the base station in question. If the base station 105 is an eNodeB, using LTE-type radio access, the resource block may have a time range of a millisecond, and a frequency range of 180 kHz. In GSM, a resource block may be referred to as a TTI (Transmission Time Interval), having a time range of 20 ms and a frequency band corresponding to 200 kHz.

As previously discussed, a radio condition and a quality of service for the user equipment 120 may be dependent on transmission parameter values in the user equipment 120 itself, as well as on transmission parameters values in the base stations 105, 110, 115.

The transmission parameters relevant for this disclosure are transmission parameters which have nominal values, i.e. values that are normally used during operational mode. The term transmission parameter is in this disclosure used as a general term for various such parameters relevant for radio transmissions, for example antenna tilt, beam direction, beam width, antenna gain and output power.

The nominal values may have been chosen based on simulation, or may simply have been set to a standard value that has proved to work for other base stations in similar environments, or for other user equipments. The nominal, or normal, value for a transmission parameter may vary between radio network nodes, even if the radio network nodes in question are of the same type. There may be more than one transmission parameter of the same type in the radio network node. For example, in a base station, there may be several antennas which may have different respective nominal values for an antenna tilt. A change in such a nominal transmission parameter value results in a change of the radio environment not only in the own cell, but also risk having an impairing and/or unpredictable effect on the radio environment and the quality of service in other neighbouring cells.

The transmission parameters of the user equipment 120 may be the same as for the base station, but typically the output power is of interest.

The transmission parameters of the base stations 105, 110, 115 may be for example an antenna configuration parameter such as for example antenna tilt, beam direction, beam width, antenna gain, or an output power.

Embodiments herein provide a method for testing a transmission parameter value of a radio network node, such as for example the base stations 105, 110, 115 and the user equipment 110 depicted in FIG. 1, during operational mode thereof. How this may be done according to some embodiments herein will be described with reference to FIG. 2 below.

Figure 2:
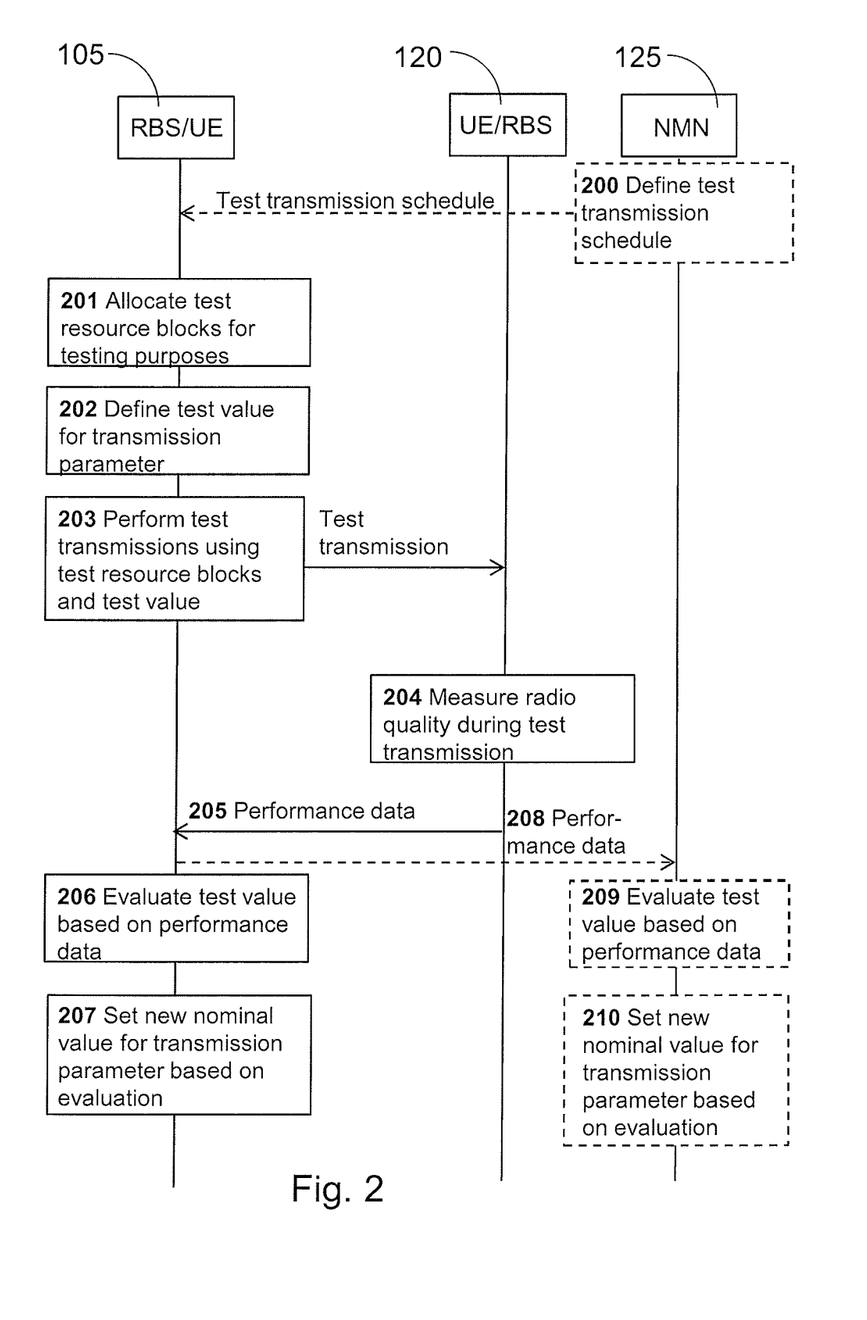
FIG. 2 is a combined signalling scheme and flowchart illustrating embodiments in a wireless communication system.

FIG. 2 shows a combined flowchart and signalling scheme. It should be noted that the actions which will be referred to may in another embodiment be taken in another suitable order.

In FIG. 2, "UE" refers to a user equipment which in this example is the user equipment 120 depicted in FIG. 1. "RBS" refers to a base station which in this example is the first base station 105 in FIG. 1. "RBS/UE" indicates that the actions performed by that radio network node, which in this example is the first radio network node 105, may be performed by either one of the first base station 105 and the user equipment 120. Similarly, the other radio network node in FIG. 2, which in this example is the user equipment 120, is denoted "UE/RBS", i.e. with the notation in reversed order. This is so to indicate that one of the radio network nodes in FIG. 2 is the first base station 105, and the other is the user equipment 120.

Action 200 is an optional action according to which the base station 105 obtains a test transmission schedule from a network management node 125. This will be further described later in this disclosure, in relation to actions 208-210.

In action 201, the first base station 105 allocates a set of test resource blocks among its available time and frequency resources for test purposes.

As previously discussed in relation to FIG. 1, transmissions between the user equipment 120 and the base station 105 may be scheduled by resource blocks being allocated for each transmission by the base station 105.

It should however be noted that the term allocating in the context of this disclosure is not limited to the allocation performed in relation to scheduling by a base station, and should be understood as the act of selecting, or dedicating, a resource block for a transmission to be performed. Hence, "allocating" may also be performed by the user equipment 120, for example based on instructions, e.g. scheduling, from another network node such as for example the first base station 105 in the wireless communication system 100.

In this example, the test set of resource blocks is made up of several resource blocks, each with a duration of 1 ms, which are essentially uniformly distributed over a time interval that may last for example for hours or days. The test resource blocks are repeated during the test interval so that the test resource blocks in this example together cover about 0.1% of the total amount of resource blocks in the time interval.

The term "resource block", the meaning of which within this disclosure has been previously described, will be further exemplified and discussed later in this document, in relation to FIG. 3. It will then also be described, by way of example, how the test set of resource blocks may be chosen among available resources in the time domain and frequency domain.

In action 202, the first base station 105 defines a test value, i.e. a value to be tested for the transmission parameter. In this example, the transmission parameter in question is an antenna tilt of the first base station 105. The antenna tilt affects the coverage of, and the radio environment within, the cell A where the user equipment 120 is located. The test value for the antenna tilt is in this example defined to +3 degrees compared to the nominal, i.e. normal, value for the antenna tilt. It will be further exemplified and discussed later in this document, in relation to FIG. 4, how a test value may be chosen for a transmission parameter.

In action 203, the first base station 105 performs a test transmission using the allocated test resource blocks. During the test transmission, the antenna tilt is set to the test value. That is, just before the first allocated resource block is scheduled to be transmitted, the antenna is tilted +3 degrees from the nominal value. In time for the subsequent resource block, the antenna is tilted back to its nominal value, unless this subsequent resource block is also allocated for the test transmission. When the next allocated resource block is upcoming, the antenna is re-tilted to the test value, and so on.

Hence, according to embodiments herein, a configurable part, or fraction, of operational transmissions may be used for test purposes, and testing is performed during operational mode of the base station. This enables testing of the transmission parameter during real conditions, and in the true environment.

A test transmission may in some embodiments have a short time duration, i.e. using only one resource block, or a few in time contiguous resource blocks.

In some embodiments, as for example the embodiment described in the above example, the test transmission is performed over a set of test resource blocks which are distributed over the available resources, for example over a time interval in the time domain which spans over hours or days.

The test transmissions are typically carrying ordinary signalling or user data. The only thing that differs from normal transmissions is the temporarily different transmission parameter value or values. Being test transmissions, they are configured to form the basis for an evaluation of the test value.

In action 204, the user equipment 120 and the base station 105 perform measurements of a radio quality during the test transmissions. These measurements may be for example Reference Symbol Received Power (RSRP), or Reference Symbol Received Quality (RSRQ), or Signal-To-Interference Ratio (SINR).

The measurements may in some embodiments be one or more of the measurements normally reported in so called measurements reports.

In some embodiments, the measurements are specifically adapted for the test transmissions.

In action 205, performance data from the user equipment 120 is obtained by the first base station 105. Performance data may in some embodiments be transmitted from the user equipment 120 to the first base station 105, as indicated by the arrow in this example. This may be the case when the performance data is based on the measurements performed in action 204.

In some embodiments, the performance data may comprise indications of a service failure. Such indications need not necessarily be transmitted from the user equipment 120 to the first base station 105. For example, the indication may be an absence of an expected acknowledgement signal from the user equipment 120 to the first base station 105. Other indications forming part of the performance data may be for example dropped calls, handovers to other cells, signalling errors etc.

In action 206, the first base station 105 evaluates the performance data. In some embodiments, the evaluation comprises comparing performance data from the test transmissions, with performance data from the other transmissions, during which the transmission parameter(s) in question, such as the antenna tilt in this example, is set to its nominal value.

Statistical analysis may be applied and used for determining if the tested transmission parameter test value is a suitable transmission parameter setting.

In action 207, a new nominal value is determined for the transmission parameter, i.e. for the antenna tilt in this example, based on the evaluation in action 206.

In some embodiments, the evaluation may be performed by the network management node 125. This may for example be the case if several user equipments and/or base stations are involved in the testing, and the test transmissions are centrally organised, or scheduled, by the network management node 125, as indicated by action 200 in FIG. 2. In such embodiments, the performance data may be sent to the network management node 125 from one or more of the involved base stations and/or user equipments. In some such embodiments, the performance data may be obtained by the network management node 125 from the base station 105 and/or the user equipment 120.

Action 208 illustrates that the performance data may be sent from the base station 105, or user equipment 110 to the network management node 125, to enable evaluation of the performance data in this node.

Action 209 illustrates an embodiment wherein the evaluation is performed by the network management node 125.

Action 210 illustrates that one or more new nominal values may be set by the network management node 125 based on the evaluation in action 209.

In some embodiments, the actions 201-204 or 201-205 may be repeated with different test values for the transmission parameters, before the evaluation in action 206 or 209 is performed, to obtain the required amount of performance data to perform for example a desired statistical analysis. The actions 201-204 or 201-205 may for example be repeated every millisecond, or second, for a number of hours or days to provide a required amount of performance data before the evaluation is performed.

Figure 3:
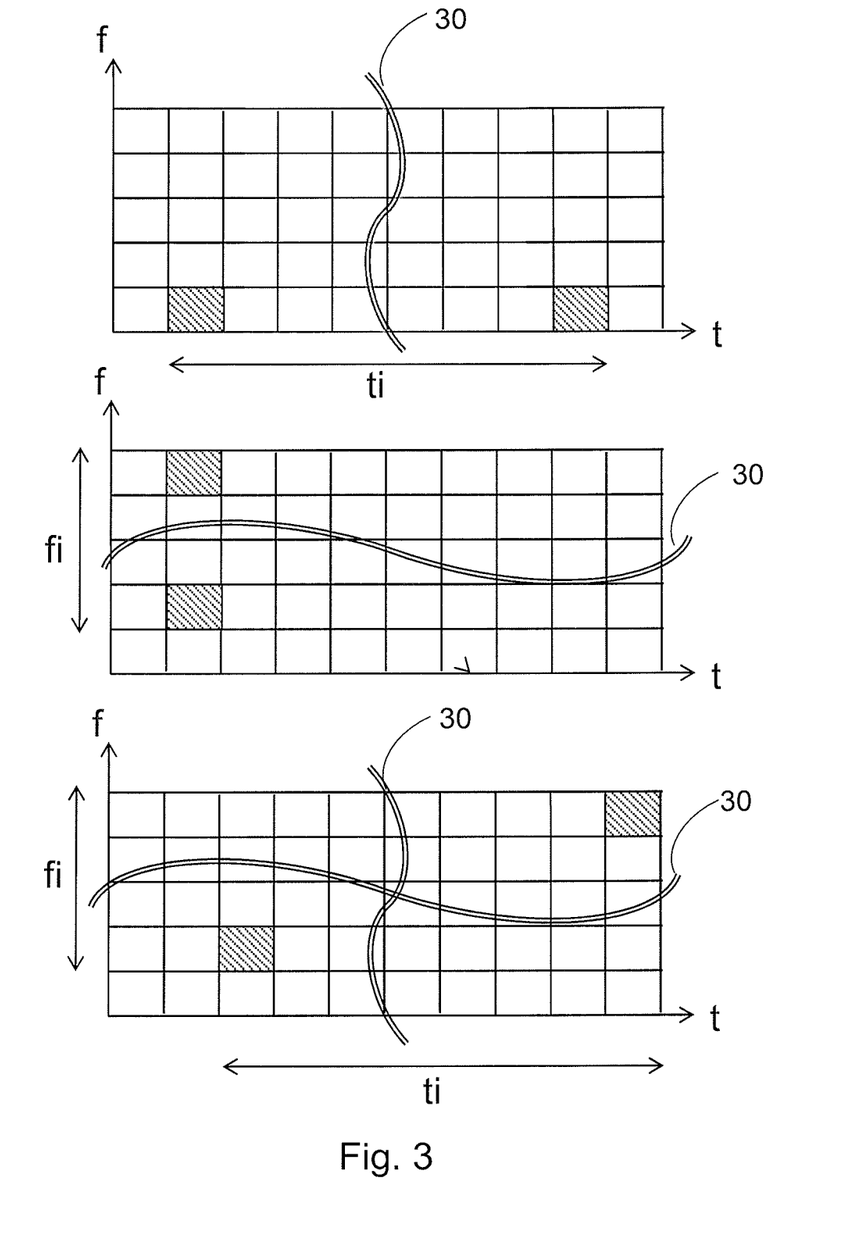
FIG. 3 is a schematic illustration of embodiments of test resource block allocations.

FIG. 3 is a schematic illustration of three different sets of test resource blocks which are allocated among available resources. The available resources are defined in the time domain as well as in the frequency domain, and each resource block is represented by a square in the figures, having a time range and a frequency range. The filled squares are test resource blocks. Referring back to the previously described example in relation to FIG. 2, action 201, a test set of resource blocks is allocated which comprises several resource blocks which are distributed over a time interval. This is illustrated in the top diagram, showing two allocated test resource blocks which are distributed over a time interval, ti. This may be the case for example in GSM, where the entire available frequency band is used for each transmission, and the resource blocks are referred to as TTIs. For the convenience of illustration, only two test resource blocks are shown, one in the beginning of the time interval, ti, and one at the end. This is because the time line in the figure is broken. This is since the time interval, ti, may span over several seconds, and the allocated resource blocks, as previously mentioned, in some embodiments are essentially periodically distributed over the whole of a time interval.

A broken time line or a broken frequency line is indicated by reference numeral 30 in the FIG. 3.

The middle diagram schematically illustrates that resource blocks may in some embodiments be allocated to be distributed over a frequency interval, fi, instead of a time interval. This may be possible for example in LTE radio access technologies.

The bottom diagram schematically illustrates that test resource blocks may be allocated to be distributed over both time and frequency.

In some embodiments, the test transmissions are performed according to a schedule which is configured to synchronize test transmissions to be performed by several radio network nodes. As previously mentioned, such a schedule may be defined by the network management node 125.

Figure 4:
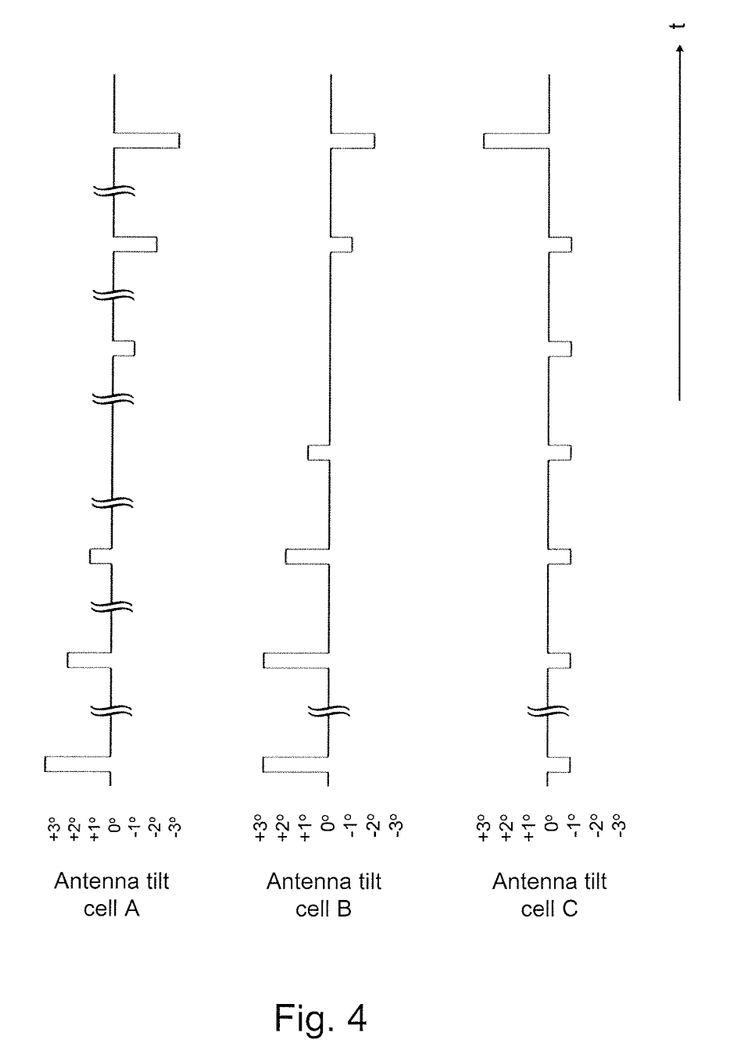
FIG. 4 is a schematic illustration of embodiments of test values for a transmission parameter.

FIG. 4 schematically illustrates, by way of example, different test values that may be used for a transmission parameter in the form of an antenna tilt.

In the illustrated example, a test comprising several test transmissions with different respective test values is performed. The antenna tilt is changed by +3, +2, +1, −1, −2, −3 degrees relative to the current, nominal, tilt, in a varying fashion that make the different cells illustrated in FIG. 1 use different values.

FIG. 4 illustrates a test of the antenna tilt in the three cells, cell A, cell B, cell C, and how it deviates from the nominal tilt value. The antenna tilt changes are synchronized between the cells, but the actual tilts vary in order to evaluate different combinations of antenna tilts.

Hence, in the example illustrated in FIG. 4, the tested transmission parameter values are changed in several cells in a synchronized manner. The sequence to use may for example either be received from a central coordinating node such as the network management node 125 illustrated in FIG. 1, or it may be determined randomly for each cell. Regardless how it is constructed, the performance evaluation is made taking the actual transmission parameter values used into consideration. The performance evaluation is made by collecting performance data during the test transmission periods.

Figure 5:
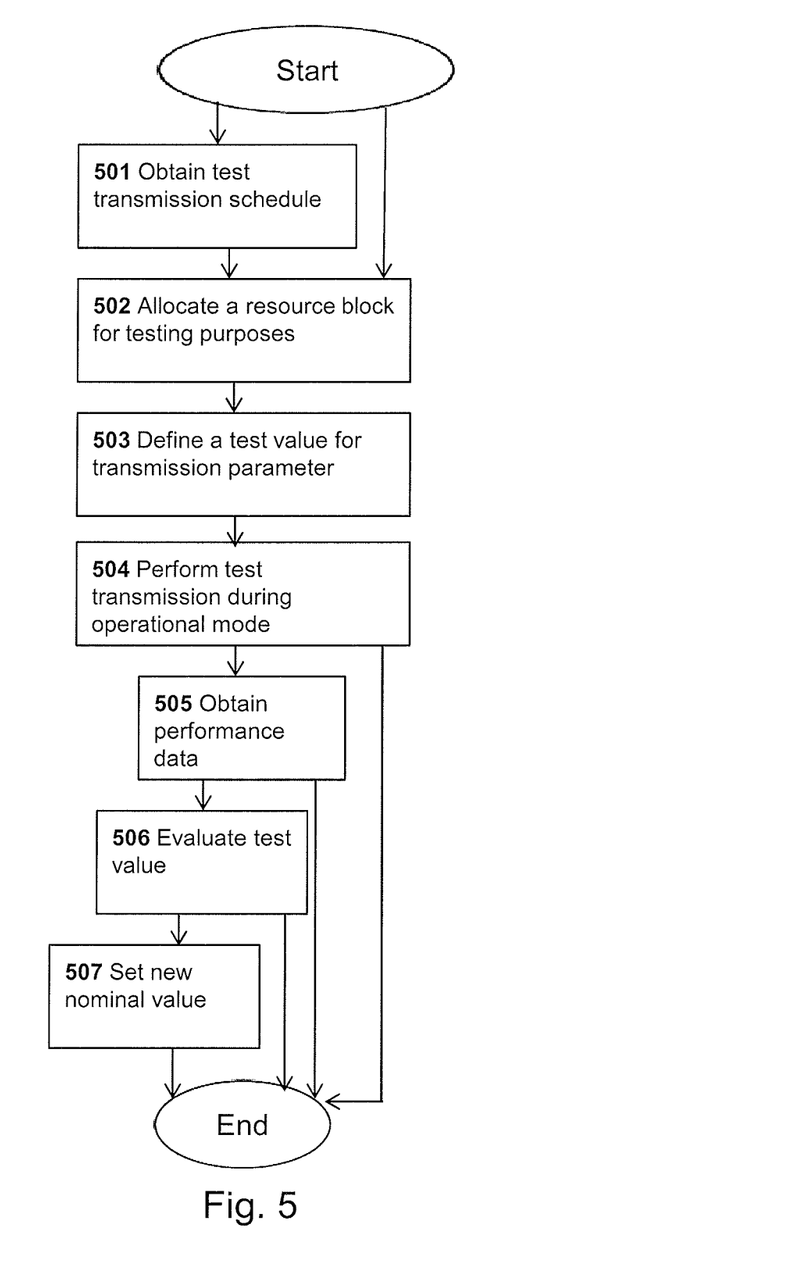
FIG. 5 is a flowchart illustrating embodiments in a radio network node.

Embodiments herein, relating to a method in the first radio network node 105, 110, 115, 120 for testing a transmission parameter value in a wireless communication system 100, will now be described with reference to the flowchart depicted in FIG. 5. As previously mentioned, the first radio network node 105, 110, 115, 120 and the second radio network node 105, 110, 115, 120 are comprised in the wireless communication system 100. The first radio network node 105, 110, 115, 120 may be a base station such as for example the first base station 105 described in relation to FIG. 1, or a user equipment, such as for example the user equipment 120 described in relation to FIG. 1.

The first radio network node 105, 110, 115, 120 is configured to, during operational mode thereof, perform transmissions using available resources comprising time resources and frequency resources which are divided into resource blocks. Each resource block has a respective time range and a respective frequency range. The first radio network node 105, 110, 115, 120 has a transmission parameter which, during operational mode of the first radio network node 105, 110, 115, 120 is set to a nominal value. The method comprises the following actions, which actions may be taken in any suitable order:

Action 501

This is an optional action, according to which the first radio network node 105, 110, 115, 120 obtains a test transmission schedule, and wherein the test transmission is performed according to the test transmission schedule.

The test transmission schedule may be configured to synchronize test transmissions to be performed by more than one radio network node 105, 110, 115, 120 in the wireless communication system 100.

The test transmission schedule may in some embodiments be obtained by the first radio network node from another radio network node, such as for example the previously described network management node 125.

According to some embodiments, the test transmission schedule is created by the first radio network node 105, 110, 115, 120 itself.

The test transmission schedule may further be arranged to synchronize several test transmissions, wherein each test transmission is to be performed with a respective test value for one or more transmission parameters. Test transmissions using different test values for a transmission parameter may in some embodiments be interleaved, such as schematically illustrated in the top diagram of FIG. 4, where the antenna tilt in the first radio network node 105 during a first test transmission is set to a first test value of +1 degree relative the nominal value, and to +2 degrees relative the nominal value during a second test transmission etc. This may be advantageous since it may facilitate and/or speed up the procedure of changing the parameter value.

In some embodiments, test values, such as for example those illustrated in FIG. 4, may be cyclically repeated.

In some embodiments, the test transmission schedule may be arranged to schedule test transmissions over time for test transmissions to be performed during various radio conditions, such as for example rush hour, day time night time etc. This may be advantageous to get good statistical data for an evaluation.

Action 502

In this action, the first radio network node 105, 110, 115, 120 allocates a test resource block, for test purposes, among the available resources.

In some embodiments, the resource block is represented by a set of test resource blocks which are distributed over at least one of a time interval, ti, comprising several resource blocks, or a frequency interval, fi, comprising several resource blocks.

The test resource blocks may together correspond to less than 10%, or less than 5%, or less than 1%, or less than 0.5%, or less than 0.1% of the total amount of resource blocks in the interval ti, fi.

Action 503

In this action, the first radio network node 105, 110, 115, 120 defines for the test resource block, a test value for the transmission parameter, which test value differs from the nominal value. In some embodiments, several transmission parameters are to be tested during the same test transmission. One or more respective test values may then be defined for each transmission parameter.

Action 504

In this action, the first radio network node 105, 110, 115, 120 performs, during operational mode, a test transmission using the resource block, wherein the transmission parameter during the test transmission is set to the test value, and wherein the test transmission is configured to form the basis for an evaluation of the test value.

Action 505

This is an optional action according to which the first radio network node 105, 110, 115, 120 obtains performance data, which performance data relates to a radio quality measured by a second radio network node 105, 110, 115, 120 during the test transmission, or which performance data is an indicator in the first radio network node 105, 110, 115, 120 that a transmission error occurred during the test transmission.

The second radio network node may be another one of a base station or a user equipment.

According to some embodiments, the obtaining comprises requesting the second radio network node 105, 110, 115, 120 to perform radio quality measurements during the test transmission.

The obtaining of performance data may be collection of performance figures such as interference, bit errors, retransmissions etc.

Action 506

This is an optional action according to which the first radio network node 105, 110, 115, 120 evaluates the test value based on the performance data.

Action 507

This is an optional action according to which the first radio network node 105, 110, 115, 120 sets a new nominal value for the transmission parameter based on the evaluation.

Figure 6:
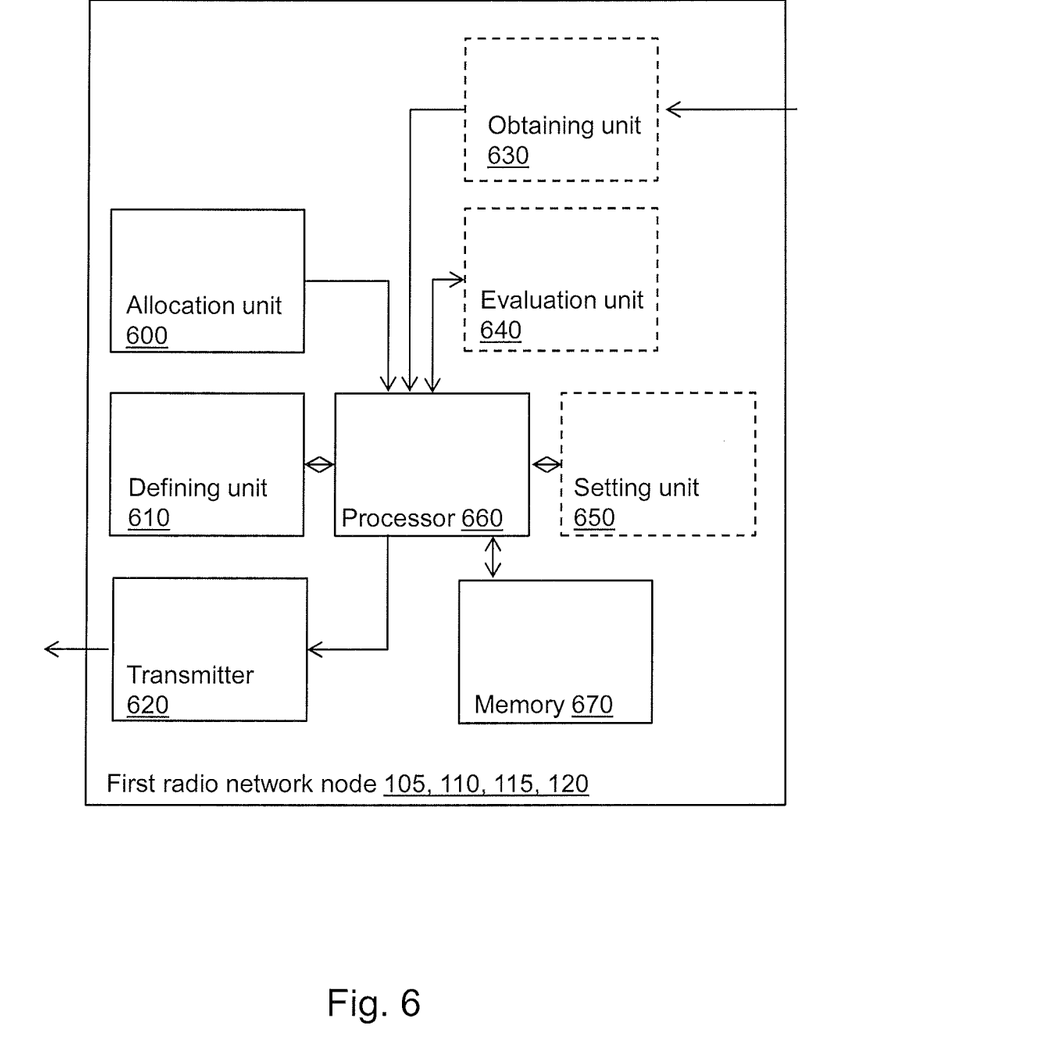
FIG. 6 is a block diagram illustrating embodiments of a network node.

To perform the actions above for testing a transmission parameter value in the wireless communication system 100 the first radio network node 105, 110, 115, 120 comprises an arrangement schematically depicted in FIG. 6. As mentioned above, the first radio network node 105, 110, 115, 120 is comprised in the wireless communication system 100. The first radio network node may be a base station such as for example the first base station 105 described in relation to FIG. 1, or a user equipment, such as for example the user equipment 120 described in relation to FIG. 1. The term "configured to" used herein may also be referred to as "arranged to". When using the word "comprise" or "comprising" it shall be interpreted as non-limiting, i.e. meaning "consist at least of".

The first radio network node 105, 110, 115, 120 comprises an allocation unit 600 configured to allocate a resource block among the available resources, for test purposes.

The test resource block may in some embodiments be represented by a set of test resource blocks which are distributed over at least one of a time interval, ti, comprising several resource blocks, or a frequency interval, fi, comprising several resource blocks.

In some embodiments, the test resource blocks together correspond to less than 10%, or less than 5%, or less than 1% or less than 0.5% or less than 0.1% of the total amount of resource blocks in the interval, ti, fi.

The first radio network node 105, 110, 115, 120 further comprises a defining unit 610, configured to define, for the test resource block, a test value for the transmission parameter, wherein the test value differs from the nominal value.

The first radio network node 105, 110, 115, 120 further comprises a transmitter 620 configured to transmit, during operational mode, a test transmission using the test resource block, wherein the transmission parameter during the test transmission is set to the test values, and wherein the test transmission is configured to form the basis for an evaluation of the test value.

According to some embodiments, the first radio network node further comprises an obtaining unit 630. According to some embodiments, the obtaining unit 630 is configured to obtain performance data, which performance data relates to a radio quality measured by the second radio network node 105, 110, 115, 120 during the test transmission, or which performance data is an indicator in the first radio network node 105, 110, 115, 120 that a transmission error occurred during the test transmission.

According to some embodiments, the first radio network node may be further configured to request the second radio network node 105, 110, 115, 120 to perform radio quality measurements during the test transmission.

According to some embodiments, the obtaining unit 630 is configured to obtain a test transmission schedule, and wherein the transmitter 620 is further configured to perform the test transmission is performed according to the test transmission schedule.

In some embodiments, the test transmission schedule is configured to synchronize test transmissions to be performed by more than one radio network node 105, 110, 115, 120 in the wireless communication system 100.

In some embodiments, the first radio network node 105, 110, 115, 120 further comprises an evaluation unit 640 configured to evaluate at least one test value based on the performance data.

In some embodiments, the first radio network node 105, 110, 115, 120 further comprises a setting unit 650 which is configured to set a new nominal value for at least one transmission parameter based on the evaluation.

The embodiments of the first radio network node 105, 110, 115, 120 for testing a transmission parameter value in the wireless communication system 100 may be implemented through one or more processors, such as a processor 660 in the first radio network node 105, 110, 115, 120 depicted in FIG. 6, together with computer program code for performing the actions of embodiments herein.

The program code mentioned above may also be provided as a computer program product, for instance in the form of a data carrier carrying computer program code for performing the embodiments herein when being loaded into the first radio network node 105, 110, 115, 120.

One such carrier may be in the form of a CD ROM disc. It is however feasible with other data carriers such as a memory stick. The computer program code may furthermore be provided as pure program code on a server and downloaded to the first radio network node 105, 110, 115, 120 e.g. remotely.

The first radio network node 105, 110, 115, 120 may further comprise a memory 670 comprising one or more memory units. The memory 670 may be arranged to be used to store data such as for example the test transmission schedule, the nominal and/or test parameter values, the performance data and/or algorithms to perform the evaluation. It may further be arranged to store applications to perform the actions of the embodiments herein when being executed in the first radio network node 105, 110, 115, 120.

For the purpose of testing transmission parameter values for evaluation as has been described in this disclosure, according to some embodiments herein, a fraction of the transmissions in cell C of the base station 105 to the user equipment 120 and/or from user equipment 120 to the base station 105 are set to operate with different transmission parameters than what is normally used, by allocation of the corresponding resource blocks for test transmissions during which one or more transmission parameters are set to test values that are not the same as their respective nominal value.

The test transmissions may have a short duration and may be synchronized between several cells, for example the whole wireless communication system 110, which may comprises a large amount of cells and base stations and user equipments, or between a set of cells under evaluation.

The amount of test transmissions taking place, using non-standard values, may be kept at a level where it will only marginally impact the overall service quality. E.g. if a service may survive 1% transmission errors, it may be considered rather safe to make a slight change of the transmission parameters during 0.5% of the transmission occasions.

The quality performance may be measured separately during each unique combination of transmissions parameters, and performance data may be obtained as also previously described.

Statistical analysis may be applied to the resulting quality and service measurements and may be used for determining suitable parameter settings.

Several considerations may be made regarding the amount of time or frequency allocated for the test transmissions. Each test transmission period should be short in time in order to not have any dramatic impact the ongoing traffic in the cells.

If the tested transmission parameter values result in poor quality, ordinary connection protection, such as retransmission schemes et cetera, may mask the poor quality. By only testing new transmission parameters for short periods, no service may be affected during the testing. Also, the tested values for the transmission parameters may deviate only somewhat from the nominal, ordinary, parameter settings; that is, chances are that the transmission quality will be sufficient for an error free communication even if the transmission parameter values are not the optimal at times.

In some embodiments, several base stations, such as for example the base stations 105, 110, 115 and/or user equipments, such as for example the user equipment 120, may be involved and participate simultaneously in the testing, at least for the obtaining of performance data. A large number of user equipments and/or base stations may be required to be involved in the testing to provide a desired amount of performance data for the evaluation. It may however be the case that only one cell is testing a test transmission parameter value.

If the values of a tested transmission parameter test value deviate only marginally from the nominal, default value for the transmission parameter, then the fraction of time allocated for test transmissions may be larger since the adverse effects are likely to be minor.

In order to keep the complexity down and the volume of the data collection relating to performance data reasonable, it may be practical to limit the number of transmission parameter values during a test campaign, and define for example, test antenna tilts between −3 and +3 degrees in 1 degree steps, or between −6 and +6 degrees in 2 degree steps.

The evaluation of transmission parameter values may also be made in several steps. An infrequent test, e.g. using only 0.1% of a total transmission time, may span over a wide set of transmission parameter values. This may then be followed by a more thorough and larger test, e.g. using 5% of the total transmission time, with only minor modifications of the transmission parameter values. This way, a possibly destructive test may be performed to span the possible solution space, and a more extensive test may be used for collecting more performance data, or statistics, around the current or proposed transmission parameter values for fine tuning.

Performance data may be obtained from each cell participating in a test. Performance data may be separated into normal operation data and the performance data related to the test transmission periods, and stored together with the actual transmission parameters used.

In some embodiments, no other base station functionality is allowed to react to the change of transmission parameters that would affect the results. For example, the scheduler in the base station 105 should use the allocated test transmission resource blocks without any special treatment.

From statistical analysis, it may in some embodiments be determined which combination of transmission parameter values provided the optimal performance, and a proposal to the operator, or an automatic retuning, or setting, of one or more new nominal values for a transmission parameter may be made.

The testing may be made over long periods of time, even permanently, and the statistical evaluation may suggest different transmission parameter values for different transmission parameters for different times of the day, for example different settings during morning rush hours and weekend nights.

It is also possible to make an estimate of how many users equipments would actually change cell, that is attach to another cell as best server, based on the tested transmission parameter values. It may then also be estimated what impact a transmission parameter change may have on the wireless communication system 100, e.g. resulting in lower/higher cell load or changes in interference level.

Modern antenna design makes it possible to change the antenna tilt, beam width and direction very rapidly. Changing the output power in a rapid manner is also possible.

By "diluting" the transmission parameter test occasions over time, the measurements span over a longer time which naturally covers many traffic situations and the measurement samples become less correlated, which is a desired property.

The main benefit of embodiments herein is that they make it possible to test and evaluate settings of antenna tilts and other transmission parameter values during operational mode in a way that has only a minimal impact on the service quality.

This may enable an operator of the wireless communication system 100 to tune these important transmission parameters in a live network that is carrying traffic, in a trial-and-error fashion without exposing the users to any significant risk.

Moreover, tuning of transmission parameters, such as antenna tilt and direction is one of the most important self-optimizing challenges within the radio network domain area. However, it is also a very delicate task, since a change to these parameters may result in lack of coverage or other negative service impacts to existing customers that are used to enjoy wireless service from their favorite location. Embodiments herein may enable and/or facilitate such tuning.

The embodiments herein are not limited to the above described embodiments. Various alternatives, modifications and equivalents may be used. Therefore, the above embodiments should not be taken as limiting the scope of the invention, which is defined by the appending claims.

The invention claimed is:

1. A method in a first radio network node for testing a transmission parameter value in a wireless communication system, which first radio network node is comprised in the wireless communication system, and which first radio network node is configured to, during operational mode thereof, perform transmissions using available resources comprising time resources and frequency resources which are divided into resource blocks, wherein each resource block has a respective time range and a respective frequency range, and which first radio network node has a transmission parameter which, during operational mode of the first radio network node, is set to a nominal value, the method comprising:
   allocating a test resource block among the available resources, for test purposes,
   defining, for the test resource block, a test value for the transmission parameter, wherein the test value differs from the nominal value,
   performing, during operational mode, a test transmission using the test resource block, wherein the transmission parameter during the test transmission is set to the test value, and wherein the test transmission is configured to form the basis for an evaluation of the test value.

2. The method according to claim 1, wherein the test resource block is represented by a set of test resource blocks which are distributed over at least one of a time interval, ti, comprising several resource blocks, or a frequency interval, fi, comprising several resource blocks.

3. The method according to claim 2, wherein the test resource blocks together correspond to less than 10%, or less than 5%, or less than 1%, or less than 0.5%, or less than 0.1% of the total amount of resource blocks in the interval, ti, fi.

4. The method according to claim 1, further comprising obtaining performance data, which performance data relates to a radio quality measured by a second radio network node during the test transmission, or which performance data is an indicator in the first radio network node that a transmission error occurred during the test transmission.

5. The method according to claim 4, wherein the obtaining comprises requesting the second radio network node to perform radio quality measurements during the test transmission.

6. The method according to claim 4, further comprising evaluating the test value based on the performance data.

7. The method according to claim 6, further comprising setting a new nominal value for the transmission parameter based on the evaluation.

8. The method according to claim 1, further comprising obtaining a test transmission schedule, and wherein the test transmission is performed according to the test transmission schedule.

9. The method according to claim 8, wherein the test transmission schedule is configured to synchronize test transmissions to be performed by more than one radio network node in the wireless communication system.

10. A first radio network node of testing of a transmission parameter value in a wireless communication system, which first radio network node is comprised in the wireless communication system, and which first radio network node is configured to, during operational mode thereof, perform transmissions using available resources comprising time resources and frequency resources which are divided into resource blocks, wherein each resource block has a respective time range and a respective frequency range, and which first radio network node has a transmission parameter which, during operational mode of the first radio network node, is set to a nominal value, the radio network node comprising:
- an allocation unit configured to allocate a test resource block among the available resources, for test purposes,
- a defining unit, configured to define, for the test resource block, a test value for the transmission parameter, wherein the test value differs from the nominal value,
- a transmitter configured to transmit, during operational mode, a test transmission using the test resource block, wherein the transmission parameter during the test transmission is set to the test value, and wherein the test transmission is configured to form the basis for an evaluation of the test value.

11. The first radio network node according to claim 10, wherein the test resource block is represented by a set of test resource blocks which are distributed over at least one of a time interval, ti, comprising several resource blocks, or a frequency interval, fi, comprising several resource blocks.

12. The first radio network node according to claim 11, wherein the test resource blocks together correspond to less than 10%, or less than 5%, or less than 1%, or less than 0.5%, or less than 0.1% of the total amount of resource blocks in the interval, ti, fi.

13. The first radio network node according to claim 10, further comprising an obtaining unit configured to obtain performance data, which performance data relates to a radio quality measured by the second radio network node during the test transmission, or which performance data is an indicator in the first radio network node that a transmission error occurred during the test transmission.

14. The first radio network node according to claim 13, wherein the obtaining unit is further configured to request the second radio network node to perform radio quality measurements during the test transmission.

15. The first radio network node according to claim 13, further comprising an evaluation unit configured to evaluate at least one test value based on the performance data.

16. The first radio network node according to claim 15, further comprising a setting unit which is configured to set a new nominal value for at least one transmission parameter based on the evaluation.

17. The first radio network node according to claim 10, wherein the obtaining unit is further configured to obtain a test transmission schedule, and wherein the transmitter is further configured to perform the test transmission is performed according to the test transmission schedule.

18. The first radio network node according to claim 17, wherein the test transmission schedule is configured to synchronize test transmissions to be performed by more than one radio network node in the wireless communication system.

19. A method in a wireless communication system for testing a transmission parameter value in the wireless communication system, which wireless communication system comprises a first radio network node, which first radio network node is configured to, during operational mode thereof, perform transmissions using available resources comprising time resources and frequency resources which are divided into resource blocks, wherein each resource block has a respective time range and a respective frequency range, and which first radio network node has a transmission parameter which, during operational mode of the first radio network node, is set to a nominal value, and wherein the wireless communication system further comprises a network management node, the method comprising:
- defining a test transmission schedule, wherein the test transmission schedule is defined by the network management node, and wherein the test transmission schedule is to be provided to the first radio network node for the purpose of performing test transmissions,
- allocating a test resource block among the available resources, for test purposes, wherein the allocating is performed by the first radio network node according to the test transmission schedule,
- defining, for the test resource block, a test value for the transmission parameter, wherein the test value differs from the nominal value, wherein the defining is performed by the first radio network node according to the test transmission schedule,
- performing, during operational mode, a test transmission using the test resource block, wherein the transmission parameter during the test transmission is set to the test value, wherein the performing is performed by the first radio network node, and wherein the test transmission is configured to form the basis for an evaluation of the test value,
- obtaining performance data, which performance data relates to a radio quality measured by a second radio network node during the test transmission, or which performance data is an indicator in the first radio network node that a transmission error occurred during the test transmission, wherein the obtaining is performed by the first radio network node,
- sending the performance data to the network management node, wherein the sending is performed by the first radio network node, and
- evaluating the test value based on the performance data, wherein the evaluating is performed by the network management node.

* * * * *